(12) United States Patent
Malhotra

(10) Patent No.: US 12,035,255 B2
(45) Date of Patent: Jul. 9, 2024

(54) TRANSMISSION POWER CONTROL FOR ELECTRONIC DEVICES IN COMMERCIAL PASSENGER VEHICLES

(71) Applicant: Panasonic Avionics Corporation, Lake Forest, CA (US)

(72) Inventor: Jaideep Malhotra, Lake Forest, CA (US)

(73) Assignee: PANASONIC AVIONICS CORPORATION, Irvine, CA (US)

(*) Notice: Subject to any disclaimer, the term of this patent is extended or adjusted under 35 U.S.C. 154(b) by 27 days.

(21) Appl. No.: 17/522,544

(22) Filed: Nov. 9, 2021

(65) Prior Publication Data

US 2023/0147344 A1 May 11, 2023

(51) Int. Cl.
- H04W 52/38 (2009.01)
- H04B 7/0417 (2017.01)
- H04W 52/28 (2009.01)

(52) U.S. Cl.
CPC ........ H04W 52/386 (2013.01); H04B 7/0421 (2013.01); H04W 52/286 (2013.01)

(58) Field of Classification Search
CPC ............. H04W 52/386; H04W 52/286; H04W 52/245; H04W 52/283; H04W 52/50; H04W 52/243; H04W 4/40; H04W 4/029; H04W 4/80; H04W 88/04; H04W 4/025; H04W 4/50; H04W 4/14; H04W 4/021; H04B 7/0421; H04B 1/0475; H04B 5/0062; H04B 7/0854; H04B 10/07; H04B 10/0793; H04B 7/0417; H04M 1/72412; H04M 1/72454; H04M 2242/14; H04M 2207/18; B64D 11/0015; G06N 20/00;

(Continued)

(56) References Cited

U.S. PATENT DOCUMENTS 6,404,388 B1 * 6/2002 Sollenberger ......... H04W 52/50
7,565,143 B2 7/2009 Takeuchi et al.
(Continued)

FOREIGN PATENT DOCUMENTS

EP 2632208 B1 5/2018
WO 2020140983 A1 7/2020

OTHER PUBLICATIONS

International Search Report and Written Opinion from International Application No. PCT/US2022/079529 dated Mar. 3, 2023 (13 pages).

(Continued)

*Primary Examiner* — Lana N Le
(74) *Attorney, Agent, or Firm* — Perkins Coie LLP

(57) ABSTRACT

This patent document describes techniques are related to an apparatus for controlling wireless transmissions on a commercial passenger vehicle. The apparatus comprises a processor communicatively coupled to multiple wireless transceivers disposed on multiple seats in the commercial passenger vehicles. The processor is configured to: control a wireless transmission power of a first wireless transceiver at an initial time based on a pre-determined power level that is computed using a first feedback from a first set of the multiple wireless transceivers; and perform an ongoing control of the wireless transmission power of the first wireless transceiver based on a second feedback received from a second set of the multiple wireless transceivers.

19 Claims, 11 Drawing Sheets

(58) Field of Classification Search
CPC ........... G06N 3/08; H04L 67/12; H04L 69/08; H04L 9/003
See application file for complete search history.

(56) References Cited

U.S. PATENT DOCUMENTS

| | | | |
|---|---|---|---|
| 7,620,364 B2 | 11/2009 | Higashida et al. | |
| 8,886,247 B1* | 11/2014 | Price | H04W 52/283 |
| | | | 455/522 |
| 2004/0098745 A1 | 5/2004 | Marston et al. | |
| 2005/0170783 A1* | 8/2005 | Krishnan | H04W 52/325 |
| | | | 455/67.11 |
| 2008/0013601 A1* | 1/2008 | Lind | H04W 52/283 |
| | | | 375/140 |
| 2009/0052386 A1 | 2/2009 | Higashida | |
| 2010/0216457 A1 | 8/2010 | Ezaki et al. | |
| 2010/0231451 A1 | 9/2010 | Noguchi et al. | |
| 2011/0128949 A1 | 6/2011 | Ezaki et al. | |
| 2011/0244890 A1 | 10/2011 | Lehmann et al. | |
| 2014/0013365 A1 | 1/2014 | Ezaki et al. | |
| 2014/0372775 A1* | 12/2014 | Li | H04W 52/283 |
| | | | 713/300 |
| 2016/0004876 A1 | 1/2016 | Bye et al. | |
| 2016/0095045 A1 | 3/2016 | Salomon et al. | |
| 2017/0243485 A1* | 8/2017 | Rubin | H04W 4/40 |
| 2019/0052294 A1* | 2/2019 | Abdelmonem | H04W 52/245 |
| 2019/0098478 A1* | 3/2019 | Rabii | H04W 4/40 |
| 2019/0149611 A1 | 5/2019 | Mueller et al. | |
| 2019/0253980 A1* | 8/2019 | Rabii | H04W 52/243 |
| 2019/0266479 A1* | 8/2019 | Singh | G06N 20/00 |
| 2019/0297585 A1 | 9/2019 | Barnes et al. | |
| 2020/0339266 A1 | 10/2020 | McMillan | |
| 2021/0075521 A1 | 3/2021 | Bolotski et al. | |

OTHER PUBLICATIONS

International Search Report and Written Opinion from International Application No. PCT/US2022/079531 dated Mar. 22, 2023 (14 pages).

Extended European Search Report from European Patent Application No. 23156789.2 dated Jun. 20, 2023 (11 pages).

* cited by examiner

TRANSMISSION POWER CONTROL FOR ELECTRONIC DEVICES IN COMMERCIAL PASSENGER VEHICLES

CROSS REFERENCE TO RELATED APPLICATIONS

The present patent document is related to U.S. patent application Ser. No. 17/522,458, entitled "WIRELESS COMMUNICATION TECHNIQUES USING RADIATION SHIELDING STRUCTURE IN COMMERCIAL PASSENGER VEHICLES," filed on Nov. 9, 2021. The aforementioned Patent Application is incorporated by reference herein in its entirety.

TECHNICAL FIELD

This document is generally related to systems, methods, and apparatus to improve passenger experiences during a travel in a commercial passenger vehicle such as airplanes, passenger train buses, cruise ships, and others.

BACKGROUND

Commercial travel has evolved with the increasing popularity of personal electronic devices (PED) that passengers carry on and media play devices provided in commercial passenger vehicles. Passenger experiences for travels sometime rely on wireless connections provided during travel in commercial passenger vehicles. Thus, systems in commercial passenger vehicles can be designed to provide passengers with a positive travel experience by improving wireless connections.

SUMMARY

This patent document describes exemplary systems, methods, and apparatus to improve passenger experiences by providing an optimized power level to electronic devices in commercial passenger vehicles, thereby allowing passengers to be connected to a wireless communication.

In one aspect, a method of providing an entertainment to passengers on a commercial passenger vehicle is provided. The apparatus comprises: a processor communicatively coupled to multiple wireless transceivers disposed on multiple seats in the commercial passenger vehicles, wherein the processor is configured to: control a wireless transmission power of a first wireless transceiver at an initial time based on a pre-determined power level that is computed using a first feedback from a first set of the multiple wireless transceivers; and perform an ongoing control of the wireless transmission power of the first wireless transceiver based on a second feedback received from a second set of the multiple wireless transceivers.

In another aspect, an in-vehicle communication system for controlling wireless transmissions on a commercial passenger vehicle is provided. The system comprises: a first electronic device disposed on a first passenger seat in the commercial passenger vehicle and configured to transmit a pairing request at an initial power level to establish a connection with another device in the commercial passenger vehicle; a set of second electronic devices disposed on different passenger seats from the first passenger seat in the commercial passenger vehicle, each second electronic device configured to provide feedback data that includes a reception signal strength corresponding to the pairing request from the first electronic device, and wherein first electronic device is further configured to perform a transmission at an adjusted power level based on the feedback data.

In another aspect, a method of providing an entertainment to passengers on a commercial passenger vehicle is provided. The method includes sending, by a first electronic device disposed on a first passenger seat in the commercial passenger vehicle, a pairing request having a first power level to establish a wireless connection with another device located in the commercial passenger vehicle; receiving a set of feedback data from a set of second electronic devices disposed on different passenger seats from the first passenger seat in the commercial passenger vehicle, each second electronic device configured to provide feedback data including a reception signal strength corresponding to the pairing request from the first electronic device; determining, by the first electronic device, a second power level based on the feedback data; and performing a transmission to the another device at the second power level.

In yet another exemplary aspect, the above-described methods are embodied in the form of processor-executable code and stored in a non-transitory computer-readable program medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Recent advances in wireless technologies allow passengers to be able to enjoy wireless connections during a travel in a commercial passenger vehicle. With the limited resources available in the commercial passenger vehicle, it becomes more important how to optimize limited resources to support wireless connectivity for passengers during a travel. The technical solutions described in the present document can be embodied in implementations to improve wireless connections within the commercial passenger vehicle by optimizing a transmission power of transmission of an electronic device on a commercial passenger vehicle. With various examples of the suggested entertainment options, it is possible to provide a more reliable connectivity to a passenger during travel, which can increase passenger experience during the time they stay in the vehicle.

Figure 1:
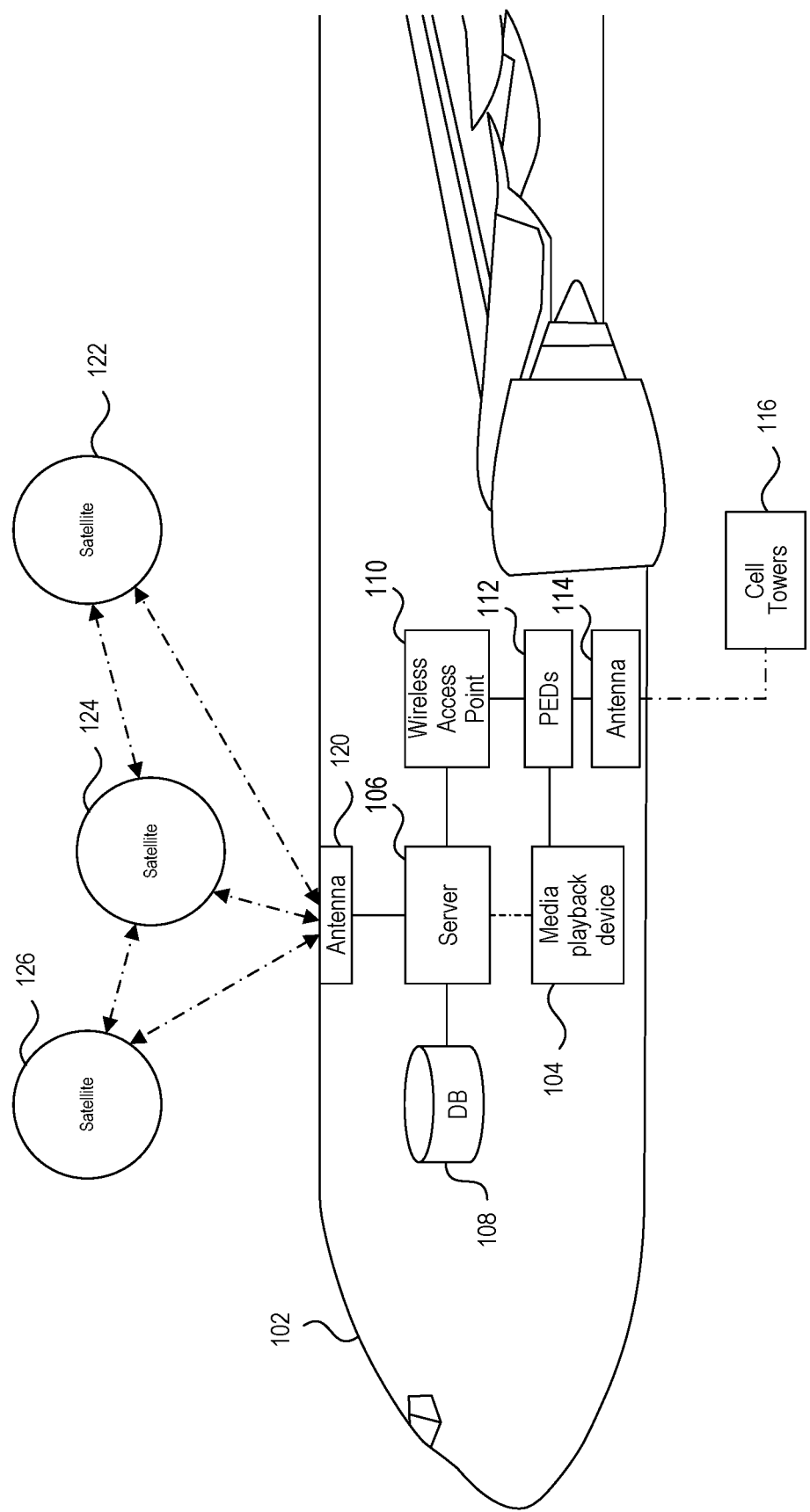
FIG. 1 shows an exemplary vehicle entertainment system installed in an airplane based on some implementations of the disclosed technology.

FIG. 1 shows an example of an in-flight system for passengers in a commercial passenger vehicle an airplane. The example diagram of the in-flight system as shown in FIG. 1 is provided to explain how wireless connections are supported in the airplane 102. The components shown as a single element in FIG. 1, e.g., the server 106, the database 108, the wireless access point 110, etc. can be configured in multiple elements. For example, the in-flight service system can include multiple wireless access points to facilitate or support providing of wireless coverages for the passengers.

The in-flight service system includes a server 106, media playback devices 104, and a PED (personal electronic device) that are located in the airplane 102. Most travelers carry PEDs having wireless communication capability to allow users to access Internet, such as cellular phones, smart phones, tablet computers, laptop computers, and other portable electronic devices. Many of these PEDs have the capability to execute application software programs ("apps") to perform various functions. In some implementations, the media playback devices 104 are provided at each passenger seat, such as located at each of the seatbacks of the passenger seats, and/or on cabin walls and/or deployable from an armrest for seats located at a bulkhead, i.e., in the first row of a section.

The server 106 is communicably coupled with the media playback devices 104 and the PEDs 112. The communication between the server 106 and the onboard devices including the media playback devices 104 and the PEDs 112 is either realized by wired connections or wireless connections. In some implementations, the communication among the server 106, the media playback devices 104, and the PEDs 112 are achieved through the antenna 114 to and from ground-based cell towers by, for example, a provision of network plugs at the seat for plugging PEDs 112 to a wired onboard local area network. In some other implementations, the communications among the server 106, the media playback devices 104, and the PEDs 112 are achieved through the antenna 120 to and from satellites 122, 124, 126 in an orbit, e.g. via a cellular network utilizing one or more onboard base station(s), Wi-Fi utilizing the wireless access point 110, and/or Bluetooth. Thus, the server 106, the media playback devices 104, and the PEDs 112 form a local network aboard the airplane 102 through an on-board router (not shown).

Figure 2:
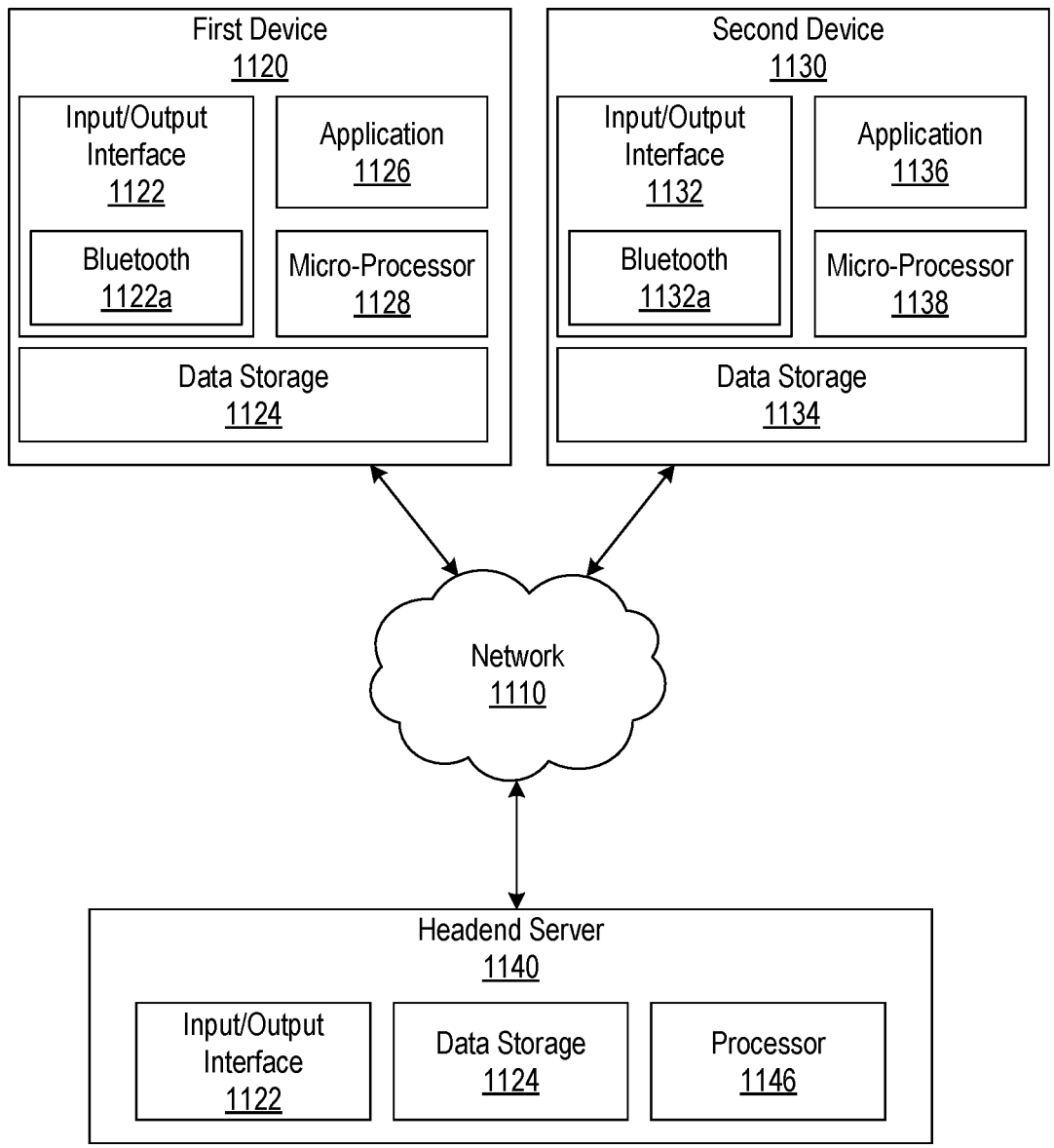
FIG. 2 shows an example block diagram of a system including a first device, a second device, and a headend server based on some implementations of the disclosed technology

FIG. 2 shows an example block diagram of a system including a first device, a second device, and a headend server based on some implementations of the disclosed technology. The first device 1120 and the second device 1130 can be wirelessly connected to each other through a short-range wireless connection such as a Bluetooth connection. In the example, the first device 1120 can be the media playback device associated with a particular passenger seat, which is located behind a headrest of a seat. In the example, the second device 1130 can be a wireless headset in the airplane, a mobile device such as a personal digital assistant (PDA), a tablet computer, and/or an electronic reader, a wearable device, a telephony device, a smartphone, a camera, a music playing device, etc. The headend server 1140 is communicatively connected to the first device 1120 and the second device 1130 and operates to control operations of the first device 1120 and the second device 1130 to provide customized wireless connection services. The headend server 1140 can be implemented as the same element as the server 106 as shown in FIG. 1 or a different component from the server as shown in FIG. 1.

In some implementations, the first device 1120, the second device 1130, and/or the headend server 1140 may include a network-enabled computer system and/or device. In the example, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

Figure 6:
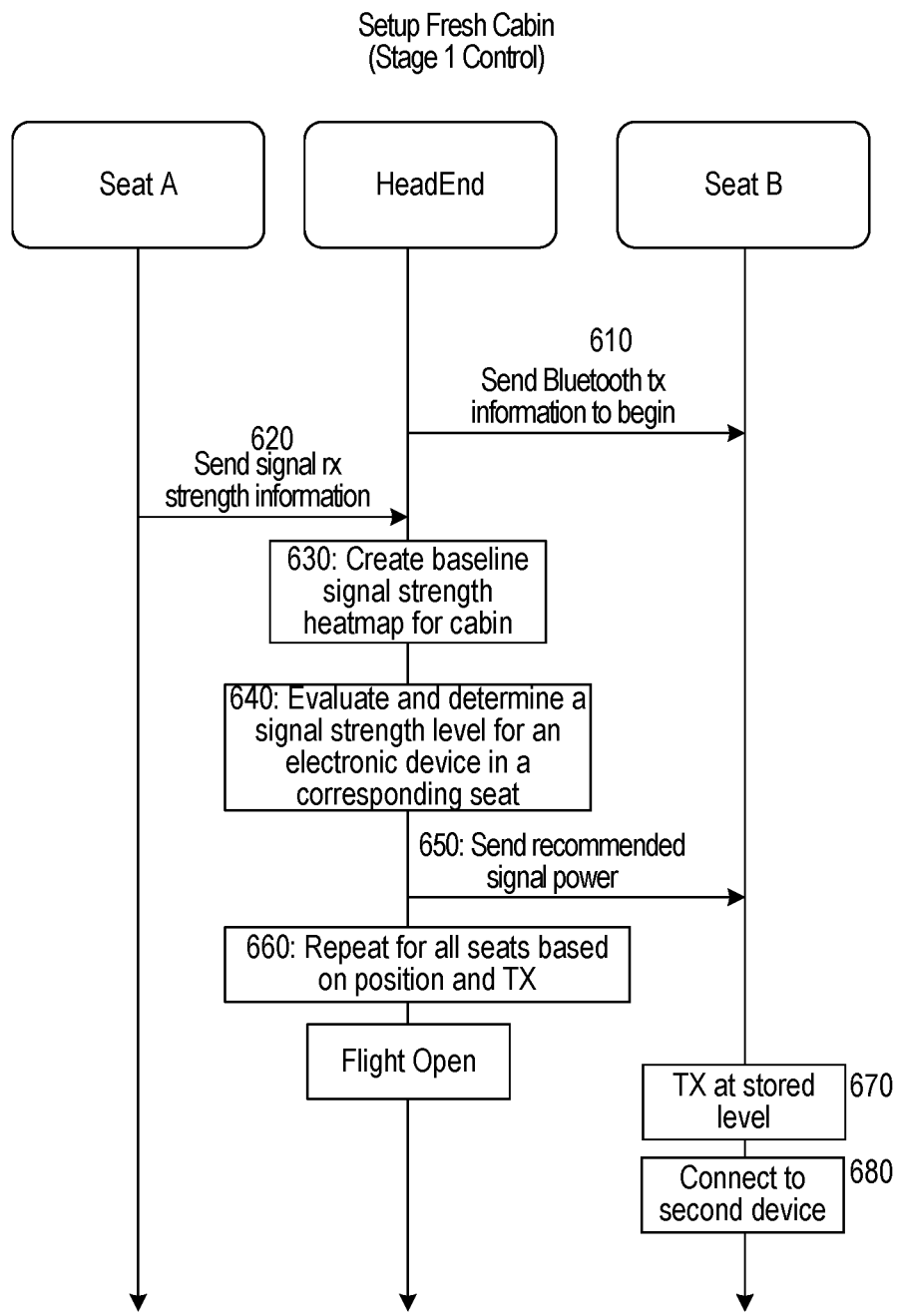
FIG. 6 shows an example of a flowchart illustrating a power level control of an electronic device in a commercial passenger vehicle based on some implementations of the disclosed technology.
Figure 8:
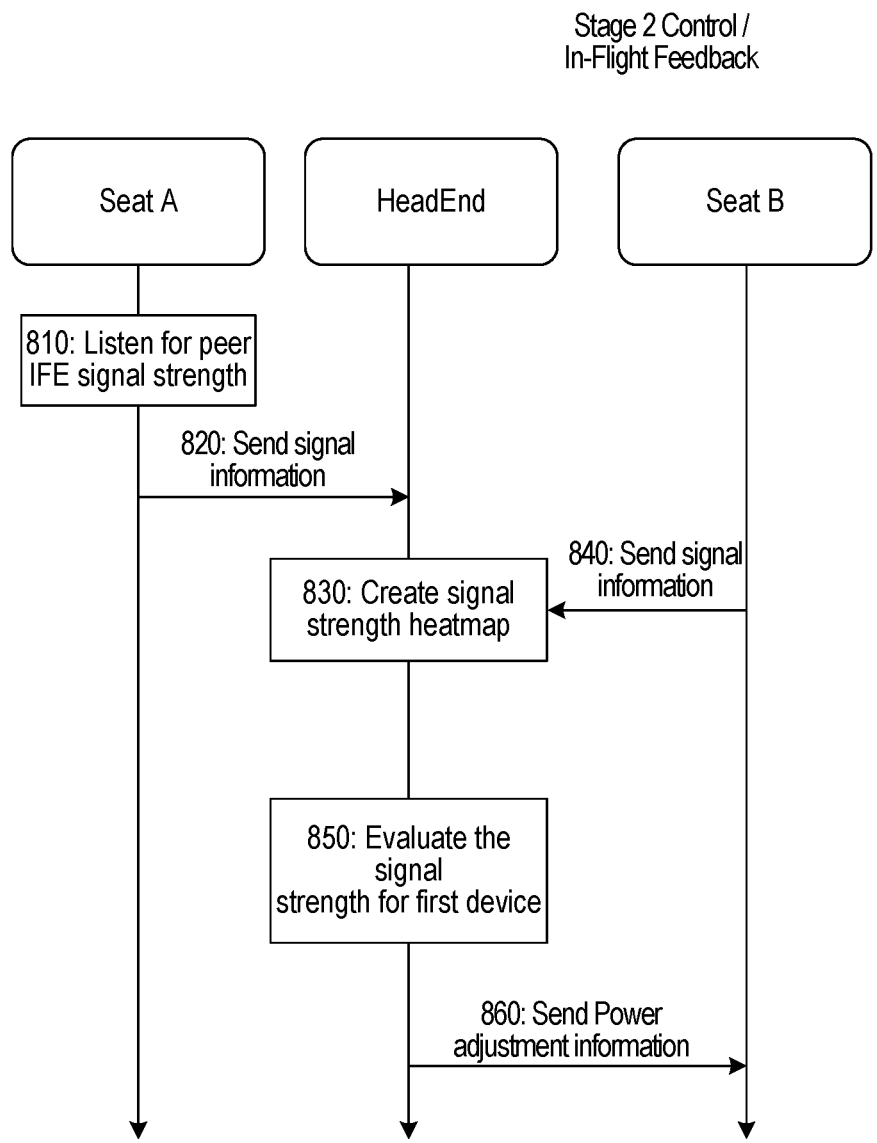
FIGS. 8 and 9 show examples of flowcharts illustrating a power level control of an electronic device in a commercial passenger vehicle based on some implementations of the disclosed technology.
Figure 9:
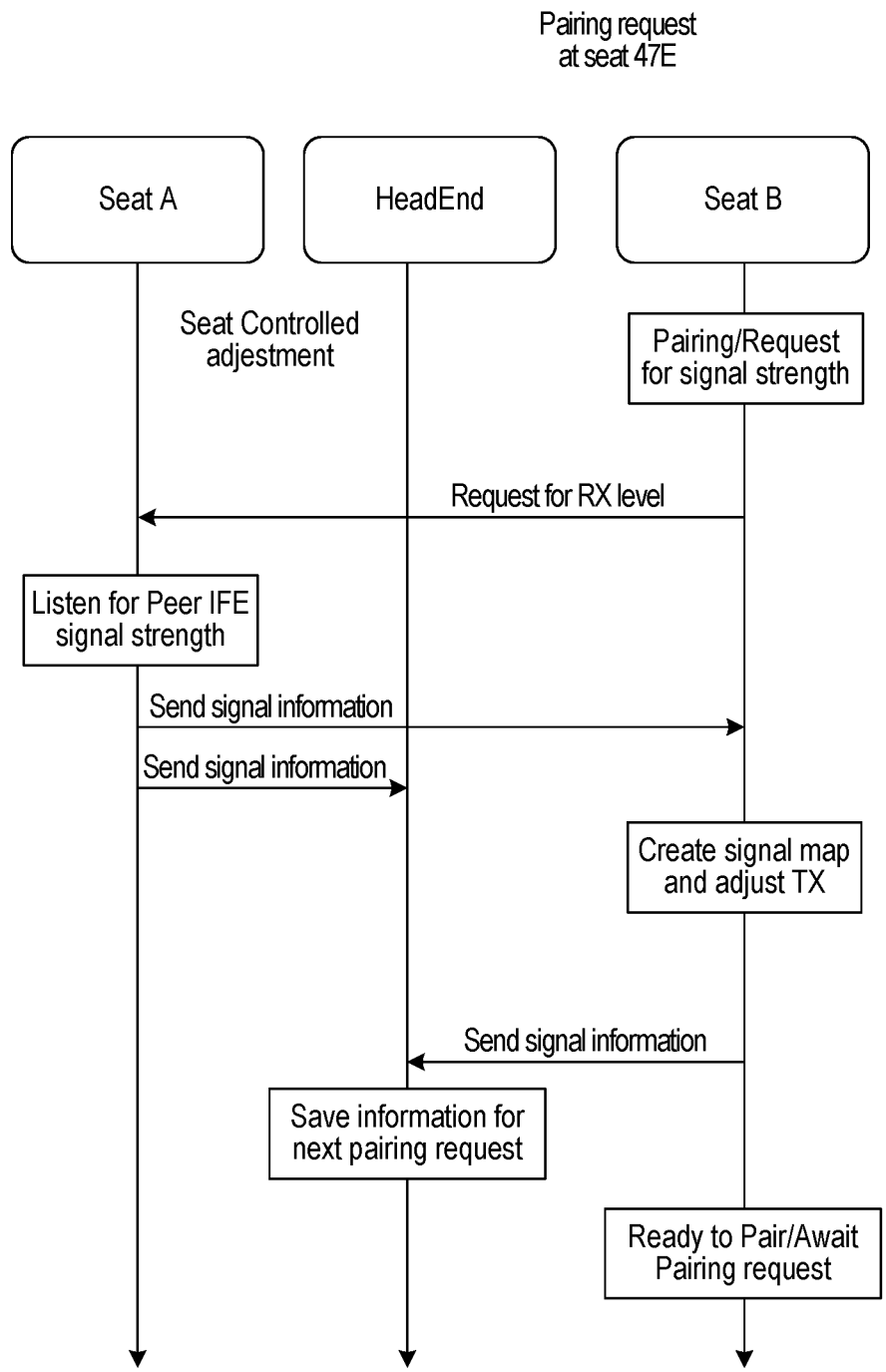

In some implementations, the first device 1120, the second device 1130, and/or the headend server 1140 may include at least one central processing unit (CPU), which may be configured to execute computer program instructions to perform various processes and methods. The first device 1120, the second device 1130, and/or the headend server 1140 may include data storage which may be configured to access and store data and information and computer program instructions, for example, the instructions as shown in FIGS. 6, 8 and 9. Data storage may also include storage media or other suitable type of memory, where the files that comprise an operating system, application programs including, for example, web browser application, email application and/or other applications, and data files may be stored. The data storage of the network-enabled computer systems may include electronic information, files, and documents stored in various ways.

In some implementations, the first device 1120, the second device 1130, and/or the headend server 1140 may further include, for example, a processor, which may be several processors, a single processor, or a single device having multiple processors. Although depicted as single elements, it should be appreciated that according to one or more embodiments, the first device 120, the second device 1130, and/or the headend server 1140 may comprise a plurality of first devices 120, second devices 1130, and/or headend servers 1140. The first device 120, the second device 130, and/or the headend server 1140 may further include data storage. The data storage may include electronic information, files, and documents stored in various ways, including, for example, a flat file, indexed file, hierarchical database, relational database, such as a database created and maintained with software, which may include an all flash array, a hybrid array, or a server-side product, enterprise storage, which may include online or cloud storage, or any other storage mechanism.

Referring to FIG. 2, the input/output interface 1122 may include for example, I/O devices, which may be configured to provide input and/or output to/from first device 1120 (e.g., keyboard, mouse, display, speakers, network cards, etc.). The input/output interface 1122 may include a display, which may include for example output devices, such as a display screen (e.g., monitor, television, or others), speakers, or others. The input/output interface 1122 may include a Bluetooth unit 1122a to support Bluetooth connection, such as Bluetooth antenna, Bluetooth APIs, or others. In the example, the input/output interface 1122a may be implemented wireless transceivers. The data storage 1124 may be configured to access and store data and information and computer program instructions, such as firmware and/or other applications. The application 1126 may include instructions that, when executed, instructs the first device 1130 to request a user log into the application, connect to a backend server, such as headend server 1140. The microprocessor 1128 may store and/or execute firmware and/or software applications stored in the second device 1130, such as application 1136.

The second device 1130 may include an input/output interface 1132 including the Bluetooth unit 1132a, data storage 1134, a software application 1136, and/or a microprocessor 1138. The similar or same operations of each component of the first device 1120 can be applied to those of the second device 1130, and thus the detailed descriptions will be omitted.

The headend server 1140 may include an input/output interface 1142, data storage 1144, and/or a processor 1146. Input/output interface 1142 may include for example, I/O devices, which may be configured to provide input and/or output to/from headend server 1140. The data storage 1144 may include random access memory (RAM) and read only memory (ROM), which may be configured to access and store data and information and computer program instructions, such as firmware and/or other applications. The data storage 1144 may also include storage media or other suitable type of memory. The processor 1146 may store and/or execute firmware and/or software applications stored in headend server 1140 as described herein.

Figure 3:
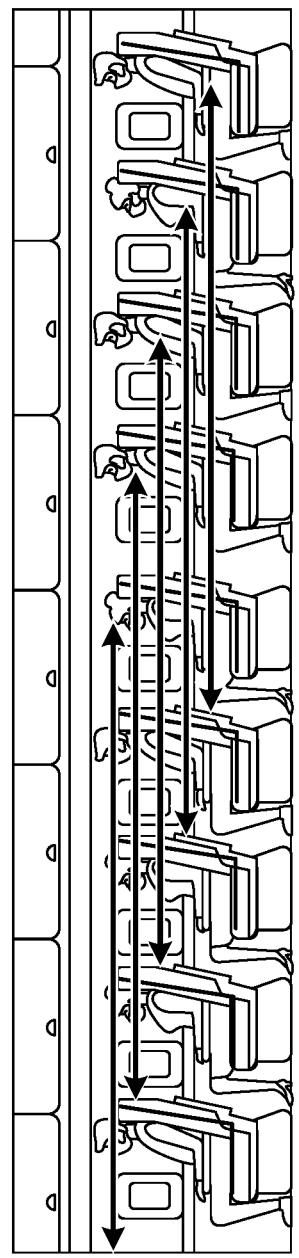
FIG. 3 shows an example view of conventional wireless communication zones that are formed in a commercial passenger vehicle.

FIG. 3 shows an example view of conventional wireless communication zones that are formed in a commercial passenger vehicle. In the example, the wireless communication zones support the short-range wireless connections according to Bluetooth™ communication protocol. When an onboard device, for example, the media playback device 104, which is associated with a certain passenger seat, transmits a paring request to another device, radio signals are transmitted from the onboard device and forms a wireless communication zone. Referring to FIG. 3, the conventional wireless communication zones extend relatively longer distance such that the wireless communication zones covers five passenger seats including two front passenger seats and two rear seats located. Such stretch of the wireless communication zone formed by the onboard devices create undesired overlaps and signal interferences. In the example of FIG. 3, the signal interferences and channel congestions are strongest in the area, e.g., around fourth to sixth passenger seats, and the electronic devices used in this area suffer unsatisfying connection qualities. In addition, when the radio signals are too congested in a certain area, even if there is a new request for a wireless connection service from another device, it is hard to add that device to the network.

To address congestions and signal interferences that occur in a limited space within a commercial passenger vehicle, the disclosed technology suggests controlling transmission power levels of electronic devices in commercial passenger vehicles.

Figure 4A:
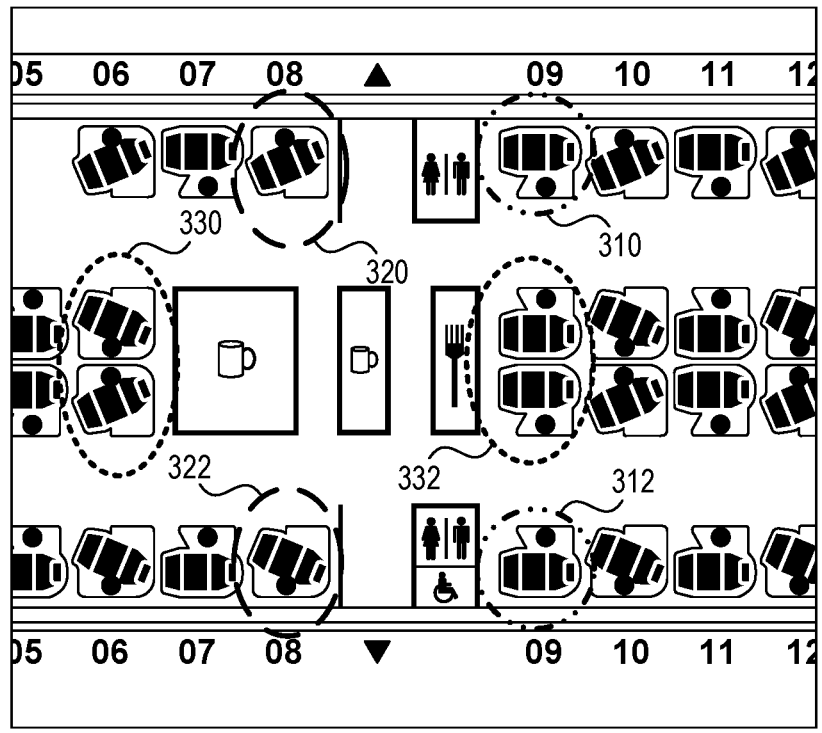
FIGS. 4A and 4B show an example view illustrating passenger seats provided in a commercial passenger vehicle.
Figure 4B:
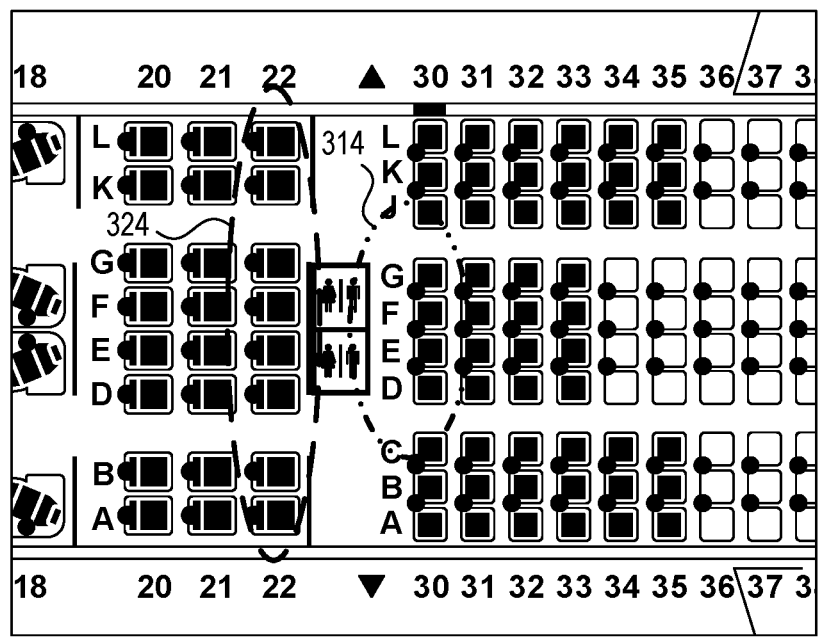

FIGS. 4A and 4B show an example view illustrating passenger seats provided in a commercial passenger vehicle. On the airplane, there are different types of passenger seats offered, which include economy, premium economy, business, and/or first class. Since the arrangements of the passenger seats, for example, spaces between adjacent seats, the number of seats arranged on a same row, etc., depend on the types of the passenger seats, the short-range wireless connection services offered for onboard devices can be different based on the types of the passenger seats. In addition, even among the same type of passenger seats, the locations of the seats on the airplane can affect the short-range wireless connection services. The conventional technique for supporting short-range wireless connections allow the electronic devices to use the same transmission power level and does not consider customizing of power levels of each electronic device on the airplane. However, there are several factors that can be considered to improve the short-range wireless connection performances.

For example, it is observed that an electronic device associated with a passenger seat 320 located at, near, or toward an emergency exit and an electronic device associated with a passenger seat 322, 324 arranged separately from another seat are at a higher transmission level than needed for wireless connections. Such unnecessary high transmission signals can create a signal overlap and interferences. On the other hand, some passenger seats require a higher transmission level than others to ensure wireless connections. For example, an electronic device associated with a passenger seat 330 and 332, which is located near a galley or a microwave, requires a relatively higher transmission power level to be able to enjoy wireless connection services. In addition, an electronic device associated with a passenger seat 310, 312, 314 that is arranged relatively close to a partitioning wall or other cabin fixtures suffers reflections and interferences and thus requires a relatively higher transmission power level. As such, an electronic device associated with a corresponding passenger seat has different conditions. In additions, various factors can affect the wireless connection during the travel, for example, demands for wireless connections from passengers, an amount of luggage carried by passengers, etc.

Figure 5:
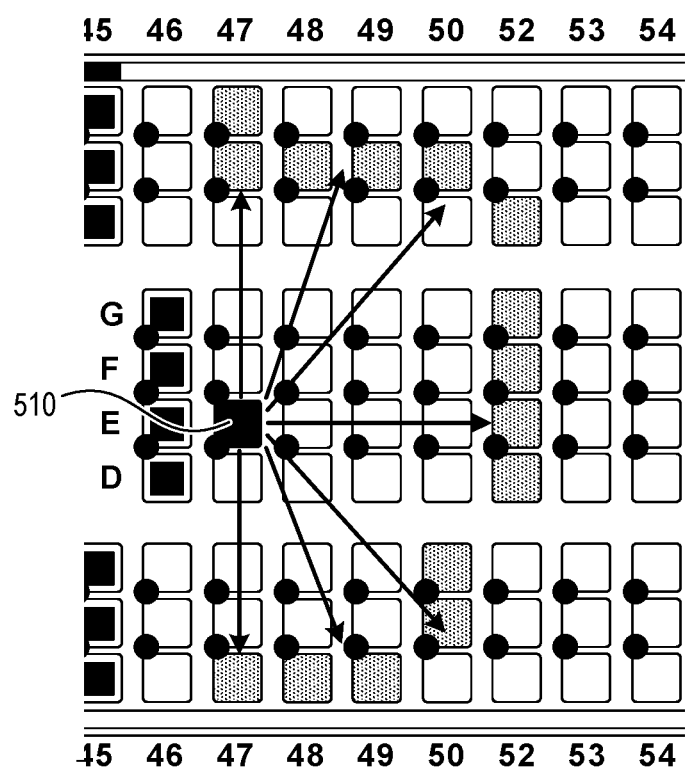
FIG. 5 shows an example view illustrating a concept of controlling a power level of an electronic device in a commercial passenger vehicle based on some implementations of the disclosed technology.

Some implementations of the disclosed technology suggest providing a customized power level for each electronic device in a commercial passenger vehicle through two stage power controls including the stage 1 control process and the stage 2 control process. FIG. 5 shows an example view illustrating a concept of controlling a transmission power level of an electronic device in a commercial passenger vehicle, which can be applied both to the stage 1 control process and the stage 2 control process. In the example scenario of FIG. 5, the first device 510 associated with the passenger seat 47E is configured to transmit power at a certain power level through a short-range wireless connection. In the example, the first device 510 associated with the passenger seat 47E corresponds to the media playback device located behind a headrest of a seat located in front of the passenger seat 47E and including wireless transceivers performing transmission. In the example, the another device to be connected with the first device 510 can be any device located in the commercial passenger vehicle. During each of the stage 1 control process and the stage 2 control process, second devices disposed on different seats (for example, those as marked in grey in FIG. 5) are configured to receive the transmission from the first electronic device through the simulation or in real and provide signal information about received transmission. The received signal information from the second devices can be used to determine an optimized power level of the first device 510 for wireless connections. In some implementations, the second devices configured to provide signal information during the stage 1 control process may be same as the second devices configured to provide signal information during the stage 2 control process. In some implementations, the second devices configured to provide signal information during the stage 1 control process may be different from the second devices configured to provide signal information during the stage 2 control process, in some implementations, the number of the second devices and the distances between the first device and the second devices can be determined using various algorithms.

FIG. 6 shows an example of a flowchart illustrating a stage 1 control process based on some implementations of the disclosed technology. The headend as shown in FIG. 6 may correspond to the headend device as shown in FIG. 2. The stage 1 control process as shown in FIG. 6 can be performed during a set up process before a flight. Using simulation tools, the set-up process is performed such that the first device is controlled to emit power and other devices disposed at different locations from the first device are held in the receive-only mode to collect the signal information about the received power.

Figure 7:
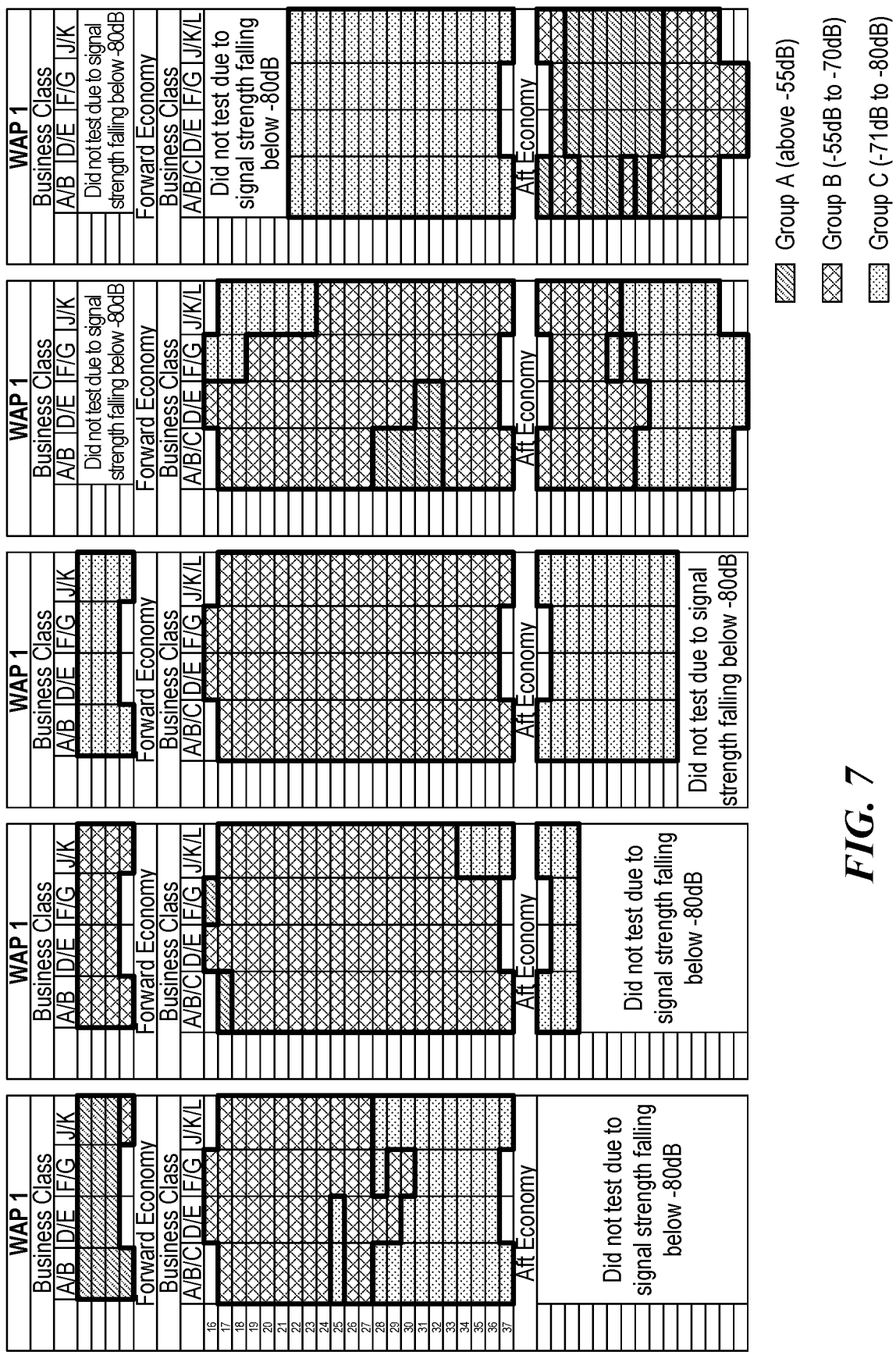
FIG. 7 shows an example of a heatmap created by a headend based on measurement data.

At step 610, the headend sends the Bluetooth transmission signal information including an initial power level to the first device associated with the seat B. At step 620, the second device associated with the seat A sends, to the headend, the signal information which includes a reception signal strength. At step 630, the reception signal strength information is visualized using various tools, for example, as a heatmap. FIG. 7 shows an example of a heatmap created by a headend based on measurement data. The heatmap provides information how many passenger seats receive a transmission from a certain passenger seat in the airplane. Also, the minimum power level required for the short-range wireless connection is already known. Thus, based on the measurement data and the minimum power level information, it is possible how to control a power level for each passenger seat based on the measurement data. In the example of FIG. 6, the power level of the first device associated with Seat B in the commercial passenger vehicle is controlled based on measurement data collected from the second device associated with seat A. Although FIG. 6 shows the single second device only, the measurement data can be received from multiple devices as shown in grey in FIG. 5.

Referring back to FIG. 6, at step 640, the headend evaluates the measurement data and determines a signal strength level for the first device associated with the seat B. For example, if the measurement data shows that the transmission from the first device associated with the seat B is received at a much higher level than the minimum required level at other passenger seats, the headend can determine the signal strength level for the first device associated with the seat B to be less than the value which initially begins the process at step 610. The logics for the evaluation and the determination are stored in the headend. As further explained later with reference to FIG. 10, the headend can be implemented using machine learning/artificial intelligence (AI) applications that perform various types of data analysis to automate analytical model building. For example, the machine learning/AI applications employ algorithms to evaluate feedback data from the second devices based on the already known information such as the minimum required level for wireless connections at a corresponding location of the commercial passenger vehicle, e.g., differences of the transmission level between the feedback data and the required minimum level. In some implementations, the machine learning/AI applications employ algorithms to determine an optimized signal strength for the first electronic device based on the evaluation. In addition to the evaluation of the feedback data from other seats in the commercial passenger vehicle, the machine learning/AI applications can consider various real time conditions, e.g., how many paring requests are being made in a certain area in the commercial passenger vehicle, how far those connections are transmitted., etc. Thus, the optimized signal strength used for wireless connections between the first electronic device and the another device can be determined at a very reasonable level for wireless connections for the electronic devices provided in the commercial passenger vehicle.

The power level determined by the headend for the first device is sent at step 650 to the first device associated with the seat B. At step 660, the headend repeats the evaluations and the determining for all seats. At step 670, the first device associated with the seat B transmits the determined power level. At step 680, the first device associated with the seat B is connected with the second device using the determined power level.

FIGS. 8 and 9 show examples of flowcharts illustrating a stage 2 control process based on some implementations of the disclosed technology. The headend as shown in FIGS. 8 and 9 may correspond to the headend device as shown in FIG. 2. The stage 2 control process as shown in FIGS. 8 and 9 can be performed based on feedback data collected during a flight. The real time adjustment made during the stage 2 control process can be based on the number of passengers on the commercial passenger vehicle, the number of paring requests concurrently made during the flight in a given area on the airplane, passenger loads, tissue absorption, overhead luggage, and/or other variables that cannot be effectively tested offline or replicated in the lab environment. FIG. 8 shows the stage 2 control process that is controlled by the headend and FIG. 9 shows the stage 2 control process that is controlled by the electronic device associated with the seat.

Referring to FIG. 8, the first device associated with the seat B is configured to make a paring request to be connected with another device in the plane and the second device associated with the seat A is configured to listen for a signal strength from the first device. Once the second device associated with the seat A detects the signal, it sends at step 820, to the headend, the signal information which includes a reception signal strength. At step 830, the headend creates the visual data, for example, the signal strength heatmap. In creating the heatmap, each electronic device associated with each seat in the airplane is aware of its location. Although FIG. 8 shows the single second device only, multiple devices which are located at other seats than the seat A can send their signal information to the headend. In some implementations, the multiple devices that are configured to send measurement data in FIG. 6 are same multiple devices that are configured to send feedback data in FIG. 8. The multiple devices may be located in the vicinity of the seat B. The headend can compare signal levels received from multiple devices at different passenger seats. At step 840, the first device associated with the seat B sends the signal information to the headend. At step 850, the headend evaluates the feedback data and determines a signal strength level for the first device associated with the seat B. As explained in relation to FIG. 6, the headend can be configured to employ machine learning/artificial intelligence (AI)-based models that make the evaluation and determination based on the number of passengers on the plane, the number of connection requests, and/or others that can affect the connections. In some implementations, for a high density usage, the electronic devices can be connected through the Bluetooth paring although the signal strength is adjusted at a relatively low power level. Thus, when there are 36 connection requests in a given space than the usual case of 10 paring requests made in the given space, the headend is configured to adjust power levels of the electronic devices to accommodate 36 connection requests so that every passenger can access another electronic device although at the lowest possible level. In some implementations, for a low density usage, the Bluetooth transmission power can be kept at a normal level such at the paring between the electronic devices are ensured while achieving as many as connections possible in a given space. In some implementations, depending on seat types, some seats can be prioritized in terms of connections and/or parings as compared to other seats. At step 860, the power adjustment information determined based on the evaluation is sent to the first device associated with the seat B.

In FIG. 9, the first device associated with the seat B is configured to make a paring request to be connected with another device in the plane and the second device associated with the seat A is configured to listen for a signal strength from the first device. At step 910, the first device associated with the seat B makes the paring request. At step 920, the request for the reception power signal level is made from the first device associated with the seat B to the second device associated with the seat A. At step 930, the second device associated with the seat A detects the signal corresponding to the paring request from the first device associated with the seat B. At step 940, the second device associated with the seat A sends signal information to the first device associated with the seat B. Although FIG. 9 shows the single second device, there can exist multiple devices disposed on different seats and configured to send their signal information to the headend. At step 950, the second device associated with the seat A sends signal information to the headend as well for the future reference. At step 960, the first device associated with the seat B creates a signal map and adjusts the transmission power level. For example, the signal adjustment can be made, for example, based on how many seats respond with the reception of the transmission signal from the second device associated with the seat B. At step 970, the first device associated with the seat B sends the adjusted signal information to the headend. At step 980, the headend saves adjusted power information for the next paring request. At step 990, the first device associated with the seat B is ready to be connected using the adjusted power information or awaits another paring request.

According to various implementations of the disclosed technology, the transmission power level of an electronic device for a short-range wireless connections can be controlled such that unnecessary overlap and signal interferences are reduced and avoided. Thus, it is possible to reduce the undesired influence of transmission signals, which enables to allow more simultaneous connections in a same space.

Figure 10:
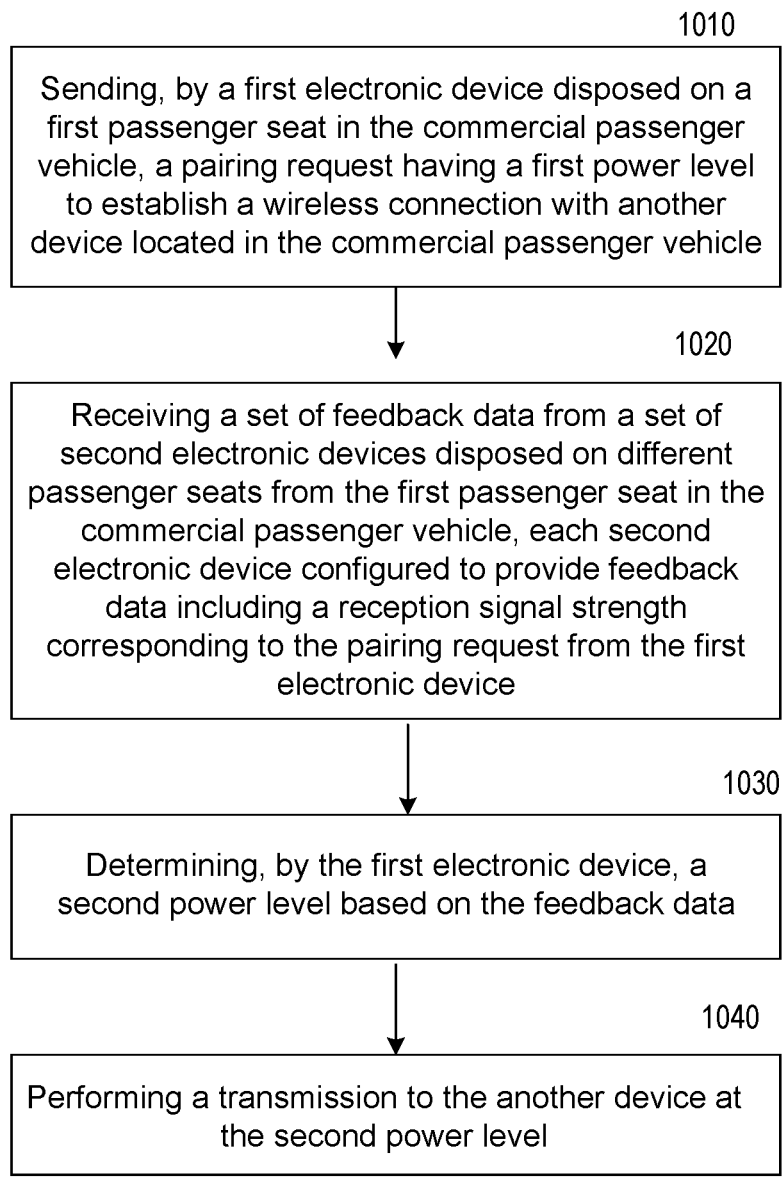
FIG. 10 shows an example of a method of providing an entertainment to passengers on a commercial passenger vehicle based on some implementations of the disclosed technology.

FIG. 10 shows an example of a method of providing an entertainment to passengers on a commercial passenger vehicle based on some implementations of the disclosed technology.

At the operation 1010, a first electronic device, which is disposed on a first passenger seat in the commercial passenger vehicle sends a pairing request having a first power level to establish a wireless connection with another device located in the commercial passenger vehicle. At the operation 1020, a set of feedback data is received from a set of second electronic devices disposed on different passenger seats from the first passenger seat in the commercial passenger vehicle, each second electronic device configured to provide feedback data including a reception signal strength corresponding to the pairing request from the first electronic device. At the operation 1030, the first electronic device determines a second power level based on the feedback data. At the operation 1040, a transmission between the first electronic device and the another device is performed at the second power level.

Figure 11:
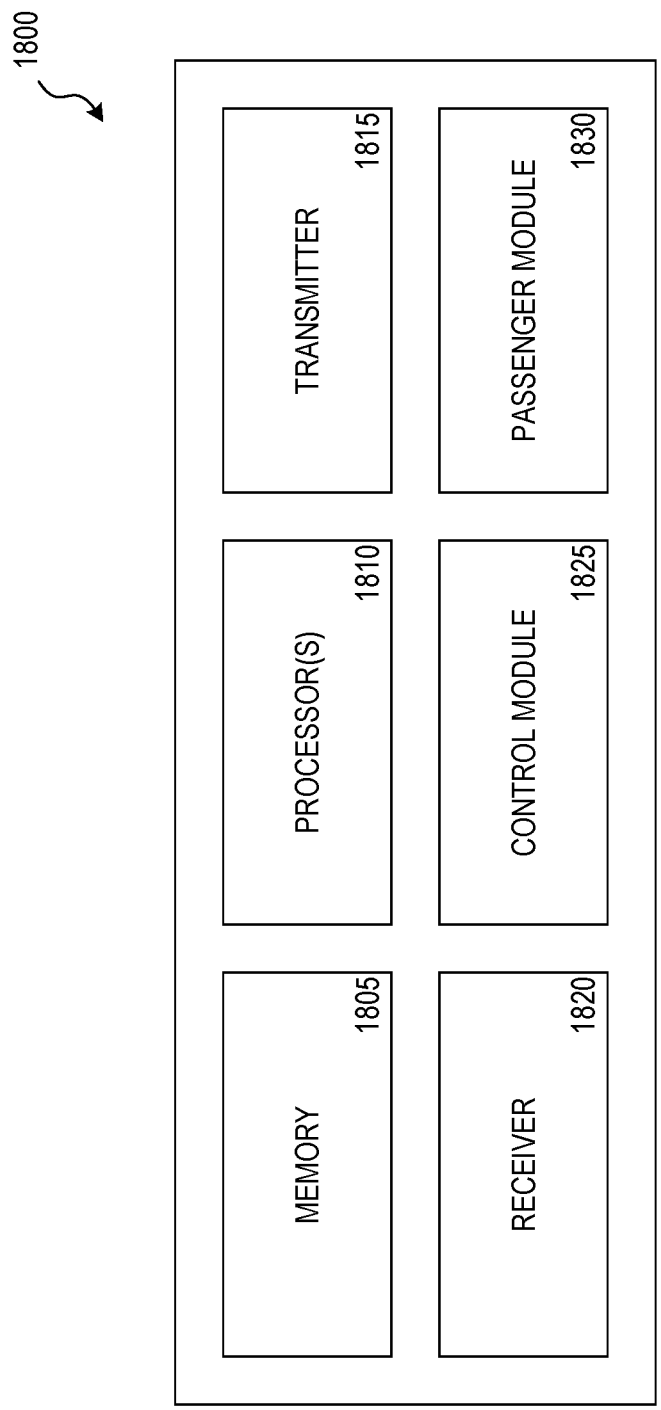
FIG. 11 shows an example of a block diagram of an in-flight server based on some implementations of the disclosed technology.

FIG. 11 shows an example block diagram of a server (e.g., headend server) that is a part of an example of the in-flight service system. The server 1800 includes at least one processor 1810, a memory 1805, a transmitter 1815, a receiver 1820, a control module 1825, or a passenger module 1830. In other embodiments, additional, fewer, and/or different elements may be used to configure the server 1800. The memory 1805 may store instructions to be executed by the processor 1810. The memory 1805 is an electronic holding place or storage for information or instructions so that the information or instructions can be accessed by the processor 1810. The memory 1805 can include, but is not limited to, any type of random access memory (RAM), any type of read only memory (ROM), any type of flash memory, etc., such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 1810 configure the server 1800 to perform the operations (e.g., the operations as shown in FIGS. 6 and 8-10). The instructions executed by the processor 1810 may be carried out by a special purpose computer, logic circuits, or hardware circuits. The processor 1810 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 810 can perform the operations called for by that instruction.

The processor 1810 operably couples with the memory 1805, transmitter, 1815, the receiver 1820, the control module 1825, and the passenger module 1830, etc. to receive, to send, and to process information and to control the operations of the server 1200. The processor 1810 may retrieve a set of instructions from a permanent memory device such as a ROM device and copy the instructions in an executable form to a temporary memory device that is generally some form of RAM. In some implementations, the server 8100 can include a plurality of processors that use the same or a different processing technology. The transmitter 1815 transmits or sends information or data to another device (e.g., another server, media playback devices 104, or PEDs 112). The receiver 1820 receives information or data transmitted or sent by another device (e.g., another server, media playback devices 104, or PEDs 112).

The control module 1825 of the server 200 is configured to perform operations to assist the in-vehicle communication system. In some implementations, the control module 1825 can be configured as a part of the processor 1810 and can perform an analysis and/or testing for wireless connections provided in the commercial passenger vehicle. Although FIG. 11 shows the control module 1825 as included in the in-vehicle server, in some implementations, the control module 1825 can operate as a separate element from the in-vehicle server and work with a ground server (not shown) to facilitate the operations for managing power levels of electronic devices in the commercial passenger vehicle. In some implementations, the control module 1825 can operate machine learning/artificial intelligence (AI) applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control mode 1825 may enable a ground server to perceive their environment and take actions that maximize the effectiveness of wireless access zones provided in the commercial passenger vehicle.

The machine learning/AI applications may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI applications can abstract away and automate the low-level mechanics of AI, and the machine learning/AI module can manage and automate much of the lower level complexities of working with AI. Each program developed in a pedagogical programming language can be fed into the control module 1825 in order to generate and train appropriate intelligence models. The machine learning/AI applications can be a cloud-hosted platform configured to manage complexities inherent to training AI networks. Thus, the machine learning/AI module can be accessible with one or more client-side interfaces to allow third parties to submit a description of a problem in a pedagogical programming language and let the online AI engine build and generate a trained intelligence model for one or more of the third parties.

The passenger module 1830 of the server 200 is configured to obtain information on passengers which can be utilized to provide the services for the passengers. The passenger information can be obtained in multiple manners and stored in the passenger module 1230. The passenger information can be obtained by the airlines and/or by a third-party prior to boarding of a corresponding passenger.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. An in-vehicle communication system for controlling wireless transmissions on a commercial passenger vehicle, the system comprising:
   a first electronic device disposed on a first passenger seat in a given space of the commercial passenger vehicle and configured to transmit a pairing request at an initial power level to establish a connection with another device in the commercial passenger vehicle;

a set of second electronic devices disposed on different passenger seats from the first passenger seat in the commercial passenger vehicle, each second electronic device configured to provide feedback data that includes a reception signal strength corresponding to the pairing request from the first electronic device, and wherein the first electronic device is further configured to perform a transmission at an adjusted power level based on the feedback data, and wherein the adjusted power level is based on a number of additional electronic devices transmitting pairing requests in the given space of the commercial passenger vehicle and the adjusted power level for a higher density usage case in which the number of the additional electronic devices is greater than a predetermined number is smaller than the adjusted power level for a low density usage case in which the number of the additional electronic devices is not greater than the predetermined number.

2. The in-vehicle communication system of claim 1, further comprising:

a headend in communication with the first electronic device and the set of the second electronic devices and configured to receive the feedback data form the set of the second electronic device and determine the adjusted power level of the transmission.

3. The in-vehicle communication system of claim 1, wherein the first electronic device is further configured to receive the feedback data from the set of the second electronic devices and determine the adjusted power level of the transmission.

4. The in-vehicle communication system of claim 1, wherein the adjusted power level is further based on a number of passengers on the commercial passenger vehicle.

5. The in-vehicle communication system of claim 1, wherein the adjusted power level is determined using a machine learning algorithm that is designed to evaluate the feedback data from the set of the second electronic devices.

6. The in-vehicle communication system of claim 5, wherein the adjusted power level is further based on a type of the first passenger seat.

7. The in-vehicle communication system of claim 1, wherein the first electronic device is configured to implement a short range wireless air interface protocol that does not provide an over-the-air power control procedure.

8. The in-vehicle communication system of claim 7, wherein the initial power level is determined using a set-up process that is performed prior to use of the commercial passenger vehicle for travel, wherein each electronic device is controlled to emit power and remaining electronic devices are configured to provide received power information.

9. The in-vehicle communication system of claim 8, wherein the set of second electronic devices is configured to provide another feedback data during the set-up process, wherein the feedback data is provided during a flight after the set-up process.

10. The in-vehicle communication system of claim 1, wherein the first electronic device is further configured to perform the transmission at the adjusted power level that is smaller than the initial power level.

11. A method of controlling wireless transmissions on a commercial passenger vehicle, the method comprising:

sending, by a first electronic device disposed on a first passenger seat in a given space of the commercial passenger vehicle, a pairing request having a first power level to establish a wireless connection with another device located in the commercial passenger vehicle;

receiving a set of feedback data from a set of second electronic devices disposed on different passenger seats from the first passenger seat in the commercial passenger vehicle, each second electronic device configured to provide the feedback data including a reception signal strength corresponding to the pairing request from the first electronic device;

determining, by the first electronic device, a second power level based on the feedback data; and performing a transmission to the another device at the second power level, wherein the second power level is determined based on a number of additional electronic devices transmitting pairing requests in the given space of the commercial passenger vehicle, and wherein the second power level for a higher density usage case in which the number of the additional electronic devices is greater than a predetermined number is smaller than the second power level for a low density usage case in which the number of the additional electronic devices is not greater than the predetermined number.

12. The method of claim 11, wherein the first power level is determined using a set-up process that is performed prior to use of the commercial passenger vehicle for travel, wherein each electronic device is controlled to emit power and remaining electronic devices are configured to provide received power information.

13. The method of claim 12, further comprising:

receiving the first power level determined during the set-up process, wherein the set of feedback data is received during a flight after the set-up process.

14. The method of claim 11, wherein the second power level is further based on a number of passengers on the commercial passenger vehicle.

15. The method of claim 11, wherein the second power level is determined using a machine learning algorithm that is designed to evaluate the feedback data from the set of the second electronic devices.

16. The method of claim 15, wherein the second power level is determined further based on a type of the first passenger seat.

17. The method of claim 11, wherein the first electronic device is configured to implement a short range wireless air interface protocol that does not provide an over-the-air power control procedure.

18. The method of claim 11, further comprising:

sending, from the first electronic device to a headend in communication with the first electronic device and the set of the second electronic devices, the second power level.

19. The method of claim 11, wherein the transmission is performed at the second power level that is smaller than the first power level.

* * * * *